No. 795,952. PATENTED AUG. 1, 1905.
G. ANGELONI & C. A. CATALANI.
PIPE COUPLING LOCK.
APPLICATION FILED AUG. 11, 1904.
2 SHEETS—SHEET 1.
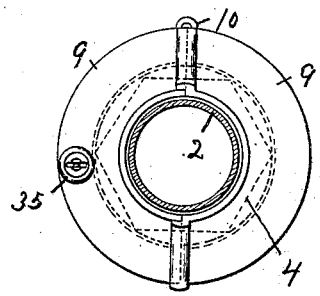
Fig. 1.
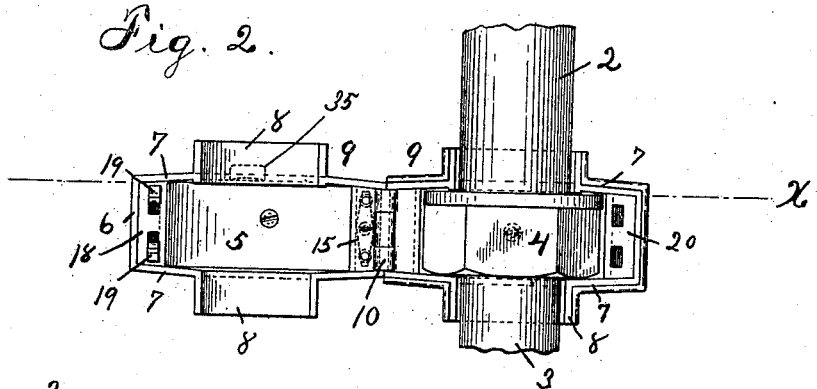
Fig. 2.
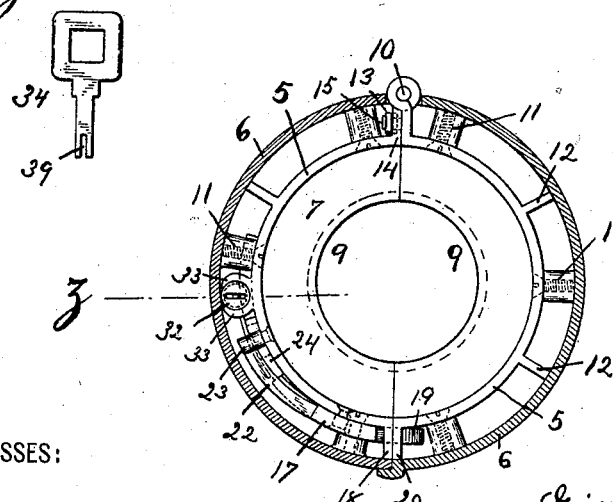
Fig. 3.
Fig. 4.
WITNESSES:
Ralph Lancaster
Russell M. Everett
INVENTORS
Giovanni Angeloni
Charles A. Catalani
BY
Charles H. Pell,
ATTORNEY.

No. 795,952. PATENTED AUG. 1, 1905.
G. ANGELONI & C. A. CATALANI.
PIPE COUPLING LOCK.
APPLICATION FILED AUG. 11, 1904.
2 SHEETS—SHEET 2.
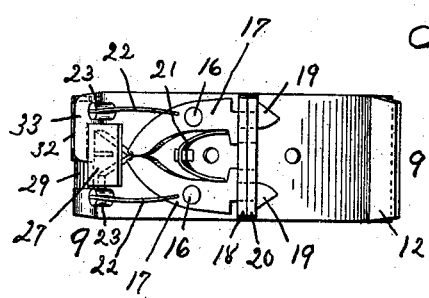
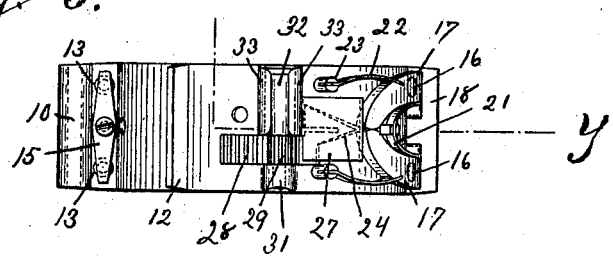
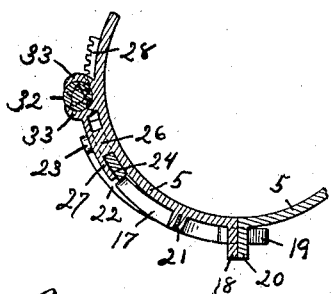
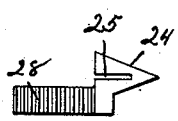
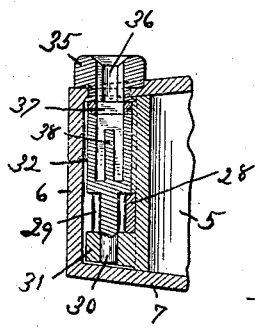
WITNESSES:
Ralph Lancaster
Russell M. Everett
INVENTORS
Giovanni Angeloni
Charles A. Catalani
BY
Charles H. Bell
ATTORNEY.

UNITED STATES PATENT OFFICE.

GIOVANNI ANGELONI, OF NEW YORK, N. Y., AND CHARLES A. CATALANI, OF NEWARK, NEW JERSEY.

PIPE-COUPLING LOCK.

No. 795,952.           Specification of Letters Patent.           Patented Aug. 1, 1905.

Application filed August 11, 1904. Serial No. 220,335.

*To all whom it may concern:*

Be it known that we, GIOVANNI ANGELONI, a subject of the King of Italy, residing in New York city, borough of Manhattan, and State of New York, and CHARLES A. CATALANI, a citizen of the United States, residing in the city of Newark, county of Essex, and State of New Jersey, have invented certain new and useful Improvements in Pipe-Coupling Locks; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide locking means for securing couplings—such as those of water-meters, gas-meters, and the like—against tampering by unauthorized parties; to secure such a construction of the locking means as shall be compact and of neat and pleasing appearance; to secure simplicity, durability, and ease of manufacture, and to obtain other advantages and results, some of which may be hereinafter referred to in connection with the description of the working parts.

The invention consists in the improved pipe-coupling lock and in the arrangements and combinations of parts of the same, all substantially as will be hereinafter set forth, and finally embraced in the clauses of the claim.

Referring to the accompanying drawings, in which like numerals of reference indicate corresponding parts in each of the several figures, Figure 1 is a view taken longitudinally of a pipe having a coupling provided with our improved lock and showing the same in plan. Fig. 2 is a side elevation of the same with the lock open or released. Fig. 3 shows a key for operating our lock. Fig. 4 is a sectional view of the lock taken on line $x$, Fig. 2. Figs. 5 and 6 are side elevations from different points of view of the annular lock having its outer walls removed to show the interior mechanism. Fig. 7 is a detail section upon line $y$, Fig. 6. Figs. 8 and 9 show in plan and edge view, respectively, a certain spreader for operating the locking-bolts; and Fig. 10 is a section upon line $z$, Fig. 4, illustrating the key socket or seat.

In said drawings, 2 3 indicate adjacent pipe-sections connected by a coupling 4 in any manner common to pipe-fitting and especially in connection with setting up meters and the like. It is often essential to insure that such couplings shall not be tampered with, and it is to do this by providing a casing which will inclose and lock around said coupling which is the object of our present invention. Said casing is annular in form to extend around and inclose the coupling 4 and has double walls 5 6, providing a space between them for the lock mechanism hereinafter described. The outer wall 6 is, moreover, extended at its edges radially inward, as at 7, past the edges of the inner wall 5, and beyond the projecting portion of the coupling, where it has a cylindrical neck 8, adapted to snugly inclose the pipe adjacent to the coupling. To enable the casing to be placed around the coupling and removed, it is made sectional, preferably in diametric halves 9 9, which are hinged together, as at 10. This hinge 10 we have shown placed upon the inner walls of the sections, the outer walls being in two semicircular parts fitted to the hinged inner wall-sections and fastened by screws 11, studs 12 insuring a proper spacing of the outer and inner walls. Obviously this construction could be reversed or otherwise modified in detail.

Little plungers 13 project through perforations in one of the hinged ends 14 of the casing-sections to engage the face of the other hinged end, the heads of said plungers being under pressure of a leaf-spring 15 and whereby they serve to hold the casing-sections normally apart.

For locking the case-sections together a bolt or bolts with suitable key means is mounted on one of the sections near its free end, and the meeting end of the other section provides keeper means to receive said bolt or bolts. Obviously the detail construction of the lock could be varied in any manner well known to the art; but we prefer to use the construction which we have shown in the drawings and will next proceed to describe.

Close to the end of one of the hinged section 9 are pivoted, as upon studs 16 16, twin locking-bolts 17, which project at their forward ends through apertures in the flange 18 of the section and are hooked, as at 19, to enter corresponding apertures or seats in the flange 20 of the other section. The hooked ends 19 of the said locking-bolts face outwardly apart and are normally held away from each other by a V-shaped leaf-spring 21, arranged between them. If necessary, other leaf-springs 22 may be mounted upon studs 23 of the case-section to force the rear ends of the locking-bolts outwardly apart and aid the V-shaped spring 21 described. It will be understood that the bolts stand normally in locking position and that when the casing-sections are pushed together they will become automatically locked.

For crowding the rear ends of the locking-bolts apart, and thus to release their forward ends from engagement with the keeper-plate, a spreader is mounted to slide upon the inner wall of the lock-casing at the rear of said bolts. Said spreader preferably has a wedge-shaped head 24, slotted, as at 25, to receive a guide 26, which at its outer end has a head 27 overlying the head 24 to hold the spreader against the casing-wall 5. At its rear end the spreader provides a rack 28, and this is engaged by a pinion 29, having upon one of its sides a pivotal stud 30, entering a bearing 31 on the casing-wall 5, and at the other side a tubular key-barrel 32, held rotatably between wings 33 33 of the casing-wall. The key, which is preferably a flat one, as shown in Fig. 3 and marked 34, is then inserted into said barrel to turn the pinion 29, and thus slide the spreader forward and disengage the bolts 17.

Any suitable construction of key-barrel common to the locksmiths' art may be employed; but we prefer to employ the one shown as being especially effective in preventing access, either visual or physical, to the lock mechanism. A rotatable socket 35 is mounted on the exterior of the casing and apertured, as at 36, to receive the key. Inside the casing the barrel 32 is similarly slotted at its end, as at 37, and the bore of the barrel has a tongue 38 to enter a slot 39 in the end of the key for turning.

It will be understood that the said lock-bolts 17, leaf-springs therefor, spreader, and its guide 26 are all curved to fit against the inner wall 5 of the annular casing.

The radial flanges 7 of the casing above described extend continuously around the pipe adjacent to the coupling, as is most clearly shown in Fig. 1, and from the inner edges of said flanges extend the cylindrical necks 8, which fit closely around the pipe. It is therefore practically impossible to insert a wire or otherwise gain any access whatever to the nut of the coupling to tamper with or turn the same in spite of the lock. The necks 8 also strengthen or stiffen the flanges 7 7, which flanges extend continuously around the said necks and radially from the same outward to the outer wall 6 of the casing, said outer wall, flanges, and necks being preferably integral or in one casting. Furthermore, our construction has the lock means between the parallel or concentric outer and inner walls 5 6, both of which are continuously and smoothly cylindrical, so as to present a regular and pleasing appearance. Upon the outer surface of said inner wall are mounted the locking means and the hinge-pin 10, so that the outer wall or wall-sections cover the locking means and overlie the said hinge or pin thereof sufficiently to prevent mischievous removal of the same, as shown in Fig. 1. Additional security is thus obtained.

Having thus described the invention, what we claim as new is—

1. In a pipe-coupling lock, an annular casing adapted to surround the pipe and inclose its coupling, said casing comprising a cylindrical body portion adapted to extend around the peripheral outer surface of the coupling, and continuous annular flanges extending inward from the edges of said band and adapted to overreach the ends of the coupling, and cylindrical necks extending one from the inner edges of each of said flanges in a direction away from the body portion and being adapted to snugly inclose the pipe adjacent to its coupling, the said annular casing being divided radially into sections with the body portions thereof having outer and inner walls extending from end to end and forming an inclosed chamber, and coöperating locking means upon the adjacent ends of two of said sections, in said chambers, the other ends being pivotally connected.

2. In a pipe-coupling lock, an annular casing adapted to surround the pipe and inclose its coupling, said casing comprising a cylindrical body portion adapted to extend around the peripheral outer surface of the coupling, and continuous annular flanges extending inward from the edges of said band and adapted to overreach the ends of the coupling, the said annular casing being divided radially into sections with the body portions thereof having outer and inner walls extending from end to end and forming a closed chamber, locking means for two adjacent ends of said sections arranged upon the inner walls thereof, and hinge members at the other ends of said sections receiving a common hinge-pin, said hinge members being upon the inner walls and the outer walls overlying the said hinge-pin to prevent tampering therewith.

3. In a pipe-coupling lock the combination with curved sections pivotally connected at one pair of their adjacent ends, of a correspondingly-curved locking-bolt pivoted on one section near its free end and adapted to engage the adjacent end of the other section, a curved rack arranged on said first-mentioned section and having a head adapted to engage the locking-bolt to operate the same, and a pinion-and-key means for moving said rack.

4. In a pipe-coupling lock, the combination with curved sections hinged together at one end, of locking-bolts pivoted on one section near its free end and adapted to engage the adjacent end of the other section, springs normally holding the rear ends of said bolts together, a spreader having a rack portion and a head adapted to enter between said bolts, a pinion meshing with said rack-and-key means for turning said pinion.

In testimony that we claim the foregoing we have hereunto set our hands this 6th day of August, 1904.

GIOVANNI ANGELONI.
CHARLES A. CATALANI.

Witnesses:
RUSSELL M. EVERETT,
M. V. DOYLE.